United States Patent Office 2,695,841
Patented Nov. 30, 1954

2,695,841

METHOD OF TREATING SEED-POTATOES FOR CHECKING PREMATURE SPROUTING

Martinus Johannes Koopmans, Boekesteijn,'s Graveland, Netherlands, assignor to Hartford National Bank and Trust Company, Hartford, Conn., as trustee No Drawing. Application January 7, 1953, Serial No. 330,168

Claims priority, application Netherlands March 25, 1952

2 Claims. (Cl. 71—2.7)

In order to prevent premature sprouting of potatoes for human consumption it is known to dust them, prior to storing them in closed spaces, with materials having a sprout-checking action and sometimes, moreover, a fungicidal action. Said materials are mostly obtained in combination with an inert carrier or an inert diluent, for example talc-powder. Substances having a sprout-checking action are, for example, naphthalene acetic acid, naphthoxyacetic acid and the respective salts and esters thereof. In the case of seed-potatoes the additional condition must naturally to be imposed that the potatoes should regain their germinative faculty when set out after having been stored in closed spaces. Hence, substances appropriate for treating potatoes for human consumption are usually unsuitable for treating seed-potatoes. For treating seed-potatoes it has been proposed to use inter alia polychlorinated mononitrobenzenes as well as mixtures of one or more growth stimulators (for example naphthalene acetic acid methyl-ester) and one or more ingredients having a sprout-checking action (for example coumarins) mostly combined with an inert diluent.

The present invention concerns a new method of treating seed-potatoes for counteracting premature sprouting to the effect that the germinative faculty of the potatoes is materially, though only temporarily weakened, that is to say that said faculty recovers upon setting out the potatoes.

In accordance with the invention, the seed-potatoes are dressed with 1,1,2,3,3,4,5,5-octachlor-pentene-1, if desired blended with a carrier or a diluent. Tests proved that a quantity of 20 to 80 mg. of the active material per kg. of potatoes yields the best results.

The said octachloro-pentene may be prepared by reacting equimolecular weights of 1-dichloro 2-chloro 3-trichloro propene-1 with 1-2 dichloroethene using aluminum chloride as a reaction catalyst. The reaction develops a rather large amount of heat, which makes it necessary to keep the reaction temperature at about 10° C. (Recueil Trauvaux Chimiques des Pays-Bas, 56, page 779 (1937).

The following tests may serve to make the invention better understood.

Seed-potatoes of the variety "Eersteling" were stored at 9 and 16° C. respectively for 40 days in single-walled paper bags after having been dusted with the anti-sprouting agent consisting of 1,1,2,3,3,4,5,5-octachlor-pentene-1, blended with an inert carrier, in this instance talc powder, in a ratio of 1,2,4 and 8 g. respectively of the active material per 100 g. of the mixture, the different potato samples having each been dusted with 2 g. of said mixtures per kg. of potatoes, corresponding to 20, 40, 80 and 160 mg. respectively of the active material per kg. of potatoes. Of each sample thus treated the weight of the sprouts developed was determined. Subsequently the potatoes were allowed to pregerminate for 26 days, that is to say they were set aside for this time in a forcing house in the open air, the potatoes then developing short, stout sprouts, so-called "light sprouts" which, as may be known, are vital to a regular emergence of the plant. After pregerminating the potatoes were set out in the forcing house, the length of the sprouts being measured 22 days after setting out the potatoes. In the table below is stated under $a$ the weight of the sprouts developed in the forcing houses, expressed in per cent of the weight of the potatoes from the date of storing them in bags, and under $b$ the average length of the sprouts in cm., 22 days after setting out.

| Quantity of active material used in mg./kg. of potatoes | Storage temperature | | | |
|---|---|---|---|---|
| | 9° C. | | 16° C. | |
| | $a$ (percent) | $b$ (cm.) | $a$ (percent) | $b$ (cm.) |
| 0 | 0.8 | 24 | 5.6 | 29.5 |
| 20 | 0.1 | 19.5 | | |
| 40 | 0.0 | 22.5 | 1.4 | 26.5 |
| 80 | 0.0 | 13.5 | 0.5 | 25 |
| 160 | | | less than 0.1 | 14 |

The aforesaid tests prove that, as a result of the treatment of potatoes in accordance with the invention, a marked sprout-checking effect occurs during the period of storing them in bags and that the germinative faculty recovers substantially completely after setting out the potatoes. Depending upon the prevailing conditions quantities of 20 to 80 mg. of the active material per kg. of potatoes will yield the optimum results.

What I claim is:

1. A method of checking premature sprouting of seed potatoes comprising dressing said seed potatoes with an anti-sprouting agent containing about 20 to 160 milligrams of 1,1,2,3,3,4,5,5-octachloro-pentene-1 for each kilogram of seed potatoes.

2. A method of preparing seed potatoes for future growth comprising the steps of dusting each kilogram of seed potatoes with an anti-sprouting agent containing about 20 to 80 milligrams of 1,1,2,3,3,4,5,5-octachloro-pentene-1, storing said treated seed potatoes in paper bags and at a temperature between about 9 and 16° C., and pregerminating said seed potatoes by exposing them to the action of light.

No references cited.